United States Patent [19]
Alexander et al.

[11] 4,087,181
[45] May 2, 1978

[54] PLUNGER ASSEMBLY

[75] Inventors: Jerry L. Alexander, St. Paul Park; Daniel B. Pendergrass, Jr., Mendota Heights, both of Minn.

[73] Assignee: Minnesota Mining and Manufacturing Company, St. Paul, Minn.

[21] Appl. No.: 720,996

[22] Filed: Sep. 7, 1976

[51] Int. Cl.[2] .............................................. G03B 27/20
[52] U.S. Cl. .................................................... 355/92
[58] Field of Search ...................... 354/15; 355/92, 99, 355/78

[56] References Cited
U.S. PATENT DOCUMENTS

| 895,577 | 8/1908 | McIntire | 355/92 |
| 1,780,701 | 11/1930 | Crane | 355/92 |
| 3,510,217 | 5/1970 | Cirimele et al. | 355/92 X |
| 3,914,775 | 10/1975 | Vogelgesang et al. | 354/15 |

Primary Examiner—Donald A. Griffin
Attorney, Agent, or Firm—Cruzan Alexander; Donald M. Sell; William L. Huebsch

[57] ABSTRACT

A plunger assembly for pressing together two smooth layers of material against a firm planar supporting surface without entrapping air between the layers. The assembly includes a soft resilient pad having adjacent surfaces disposed at an obtuse angle and meeting at a ridge. The pad is pressed against the material to first engage the ridge and then the adjacent surfaces progressively outwardly from the ridge to sweep air from between the layers of the material.

6 Claims, 5 Drawing Figures

PLUNGER ASSEMBLY

BACKGROUND OF THE INVENTION

This invention relates to plunger assemblies for applying pressure to provide intimate contact between two smooth layers of a material and in one aspect to such assemblies in a device for forming graphics via a transfer of material between the layers of the material.

U.S. Pat. No. 3,914,755 (the content thereof is incorporated herein by reference) describes a device for forming graphics along a two layer strip of radiation sensitive material via a transfer of material between the layers. The device comprises means for defining an exposure station including a plate mounted on a frame for the device which plate is essentially transparent to radiant energy. A path for the strip is defined through the exposure station adjacent one surface of the plate. A portion of a template is disposed between the plate and the strip which template portion has areas which are opaque to radiant energy and radiation transmissive areas corresponding in shape to a graphic to be formed. The strip material is exposed to radiation through the plate and template via a xenon flash lamp to form the graphic via adhesive contact between portions of the layers. Means are provided for bringing the layers of the strip material into intimate contact during exposure by the lamp which includes a plunger assembly for pressing the layers against the template and the plate. The plunger assembly comprises a soft flexible resilient pad providing a pressure surface for contacting the strip and a rigid member supporting the resilient pad on its side opposite the pressure surface. The plunger assembly is mounted on the frame for movement between a released position with the pressure surface of the pad spaced from the plate to afford movement of the strip material along the path, and an engaged position (to which engaged position the plunger assembly is moved when the strip material is exposed) at which the pressure surface of the pad presses the template and strip against the plate at the exposure station.

The pressure surface on the pad in the device described in U.S. Pat. No. 3,914,775, however, is planar, and thus the entire pressure surface comes into contact with the strip material at about the same time. The plunger assembly is moved quickly to its engage position so that such contact by the pressure surface tends to trap air between the layers of the strip material. Since formation of graphics by the device depends on intimate contact and an adhesive transfer of material between the layers in irradiated areas, air trapped between the layers can cause defects in the graphics formed, thus producing graphics of lesser precision than might otherwise be produced.

SUMMARY OF THE INVENTION

The present invention provides a plunger assembly for pressing together two layers of material against a firm planar supporting surface which assembly can quickly apply pressure without trapping pressure between the layers, and can be adapted to provide a desired predetermined pressure distribution between the assembly and the material.

The plunger assembly according to the present invention includes a soft flexible resilient pad having an arched pressure surface adapted to press the layers of the material against the supporting surface, which pad has a radiused ridge running centrally across the pressure surface with portions of the pressure surface on opposite sides of the ridge being disposed with respect to each other at an obtuse included angle. A rigid support member supports the pad and is mounted for movement from a released position with the pressure surface spaced from the strip material to afford movement of the strip material between the plunger assembly and the supporting surface, to an engaged position with the pressure surface of the pad pressing the material against the supporting surface. During such movement the ridge first engages the material, and contact between the pressure surface and the material then increases at a generally equal rate in both directions normal to the ridge to effectively sweep air from between the layers of the material.

When the plunger assembly is used in the device described from column 13, line 20, through column 21, line 7 of U.S. Pat. No. 3,914,775 it has been found that preferably the aforementioned obtuse included angle should be no greater than about 164° to completely sweep the air from between the layers of material as the plunger assembly moves in less than about 0.02 second to its engaged position from a released position with the pressure surface spaced about 0.02 inch from the strip material.

With such an included angle for the portions of the pressure surface adjacent the ridge, however, more of the pad material must be displaced under the ridge than in adjacent areas (i.e. the material of the pad is not compressible as it should not contain any substantial amount of air voids, and thus can only be resiliently displaced). As in the illustration given, if the obtuse included angle is relatively small and the pad is supported entirely across its surface opposite its pressure surface, the resistance of such displacement causes a large pressure to be exerted along and adjacent the ridge which thus requires a strong plate and plunger assembly activating means, and can apply such great pressure to the central portion of the material that the quality of the graphics produced is adversely effected. Thus with such plunger assemblies it is desirable to support the pad on the rigid member along areas that are parallel to and equally spaced from opposite sides of the ridge, and form the pad and rigid member so that when no pressure is being applied by the pressure surface there is a space between the rigid member and pad into which the portion of the pad beneath the ridge can be displaced when pressure is applied. If such a space is too large, however, it will allow excessive bending of the pad adjacent the ridge and a resultant separation of the portion of the pressure surface along the bend from the strip material when the plunger assembly is in its engaged position, and thus proper support for the strip material will not be provided during exposure of the strip material to radiation. Thus the aforementioned space should be shaped to afford only a predetermined amount of displacement of the pad into the space during movement of the plunger assembly from its released toward its engaged position, so that after such displacement the rigid member will support the pad across its entire side opposite the pressure surface to ensure a predetermined pressure distribution between the pad and material along the pressure surface.

Also, the pressure surface preferably has a matte finish which, together with recovery of the pressure surface to its original tented shape, ensures that the pressure surface will cleanly separate from the smooth strip material when the plunger assembly returns from its engaged position to its released position.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENT

Figure 1:
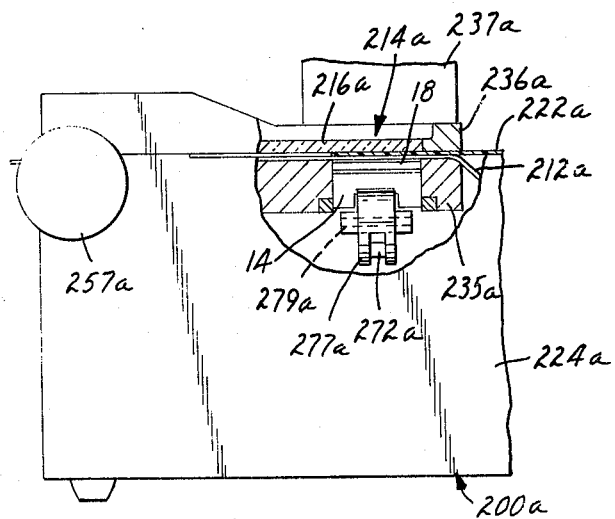
FIG. 1 is a fragmentary front elevational view, partially in section, of a device for forming graphics which includes an improved plunger assembly according to the present invention.

Referring now to the drawing there is illustrated a fragment of a device 200a which, except for the substitution of a plunger assembly 10 according to the present invention for the plunger assembly 268 described in the aforementioned patent, is essentially identical to the device 200 described in detail from column 13, line 20 through column 21, line 7 of U.S. Pat. No. 3,914,775, the entire contents of which patent is incorporated herein by reference.

For ease of cross reference, throughout this description those portions of the device illustrated which are essentially the same as portions of the device 200 described in U.S. Pat. No. 3,914,775 will be identified with the same reference numeral except for the addition of the suffix "a".

Figure 2:
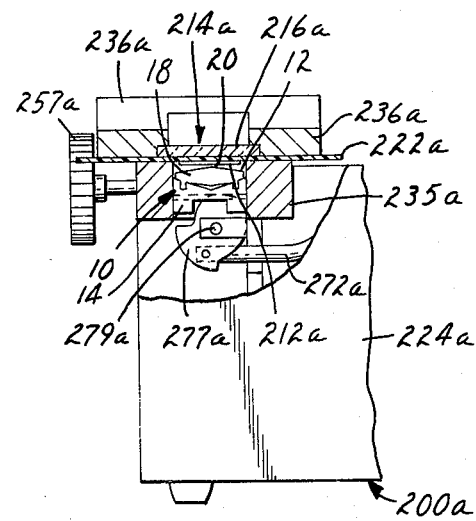
FIG. 2 is a fragmentary side elevational view, partially in section, of the device of FIG. 1.
Figure 3:
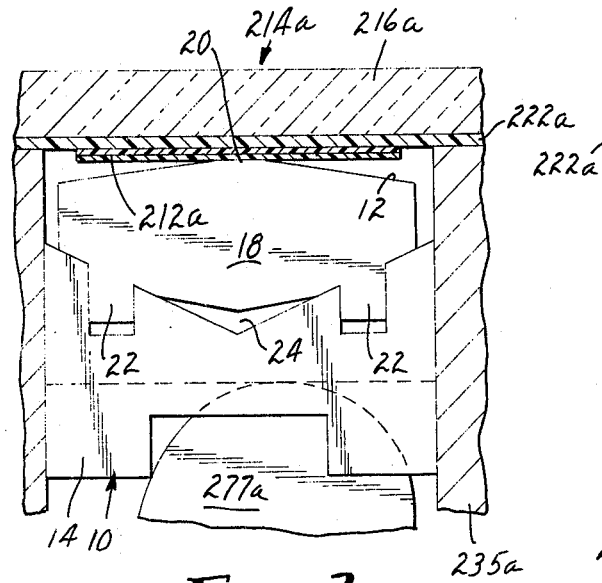
FIGS. 3 through 5 are enlarged fragmentary views of the sectioned portion of FIG. 2, which with FIG. 2 sequentially illustrate movement of the plunger assembly from a spaced position to an engaged position.
Figure 4:
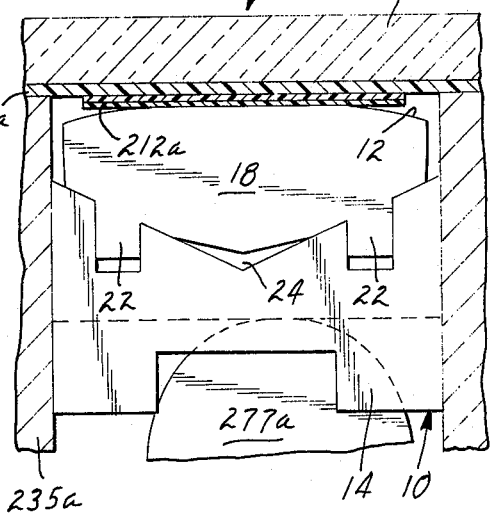

Briefly, the device 200a includes means for defining an exposure station 214a including a rectangular plate 216a which is essentially transparent to radiant energy and is mounted in a first support member 236a removably mounted on a frame 224a for the device 200a. Means is provided for defining a path for a composite two layer strip of radiation sensitive material 212a through the exposure station 214a adjacent a lower surface of the plate 216a, which means includes nipping rollers (not shown) adapted to be manually operated by a knob 257a to move the strip material 212a along the path. A portion of a thin flexible template 222a is disposed between the plate 216a and the strip material 212a. The template 222a portion has reflective coated areas which are opaque to radiant energy, and openings in the reflective coating (not shown) which provide a radiation transmissive area corresponding in shape to a graphic to be formed. Also included is the plunger assembly 10 according to the present invention, slidably mounted in a second support member 235a fixed to the frame 224a for movement between a released position (FIG. 2) with a pressure surface 12 of the assembly 10 spaced from the plate 216a to afford movement of the strip of material 212a along the path via rotation of the knob 257a, and an engaged position (FIG. 5) with the pressure surface 12 pressing the layers of the strip material 212a together against the template 222a which template 222a is supported against the plate 216a.

Means for moving the plunger assembly 10 between its released position and engaged position comprise a cam member 277a pivotably mounted on the frame 224a to a pin 279a and driven by a rod 272a which is in turn driven by pivotal movement of an arm 237a supporting a xenon flash lamp (not shown) at its distal end. Manual movement of the arm 237a to move the lamp from a position spaced from the plate 216a to a position closely adjacent the plate 216a where the lamp is flashed correspondingly moves the plunger assembly 10 from its released to its engaged position.

The plunger assembly 10 according to the present invention includes a rigid member 14 (e.g. Teflon filled polycarbonate) slidably mounted on four sides in an opening in the second support member 235a, and having a groove along its bottom surface adapted to slidably receive the periphery of the cam member 277a. A pad 18 of soft resilient flexible material (e.g. Silicone No. 700 rubber having a hardness of from 25 to 35 when measured with a Shore Durometer, Type A, as is available from the General Electric Co.) is supported on the upper surface of the rigid member 14.

The pressure surface 12 of the plunger assembly is defined by the surface of the pad 18 opposite the rigid member 14, which pressure surface 12 preferably has a matte finish (e.g. as can be produced by molding the pressure surface 12 against an aluminum wall sand blasted with 50 micron grit sand) to afford free release from the smooth surface of the strip material 212a. The pad 18 has a ridge 20 running centrally across the pressure surface 12 and aligned with the path for the strip material 212a through the device 200a, which ridge is preferably radiused (e.g. 0.5 inch radius) to reduce the high pressure that could otherwise be carried by the center of the ridge 20. The two portions of the pressure surface 12 on opposite sides of the ridge 20 are generally planar and are disposed at an obtuse included angle (e.g. 164°). The side of the pad 18 opposite the pressure surface 12 is formed with two longitudinal ribs 22 aligned parallel to and equally spaced on opposite sides of the ridge 20, which ribs 22 are fixedly received (e.g. by friction or adhesion) in corresponding grooves in the rigid member 14. Between the ribs 22 the adjacent surfaces of the pad 18 and rigid member 14 are separated from each other to provide a space 24 therebetween with no pressure being applied by the pressure surface 12. Thus engagement of the ribs 22 in the grooves provide means for supporting the pad 18 on the rigid member 14 along support areas parallel to and equally spaced from the ridge 20. This space 24 between the pad 18 and rigid member 14 is adapted so that a pressure is applied by the pressure surface 12 against the essentially planar surface of the strip material 212a, the pad can be displaced a predetermined distance into the space, after which the pad will be supported across its entire width so that it will provide a predetermined pressure distribution between the pad and the material across the pressure surface 12.

Figure 5:
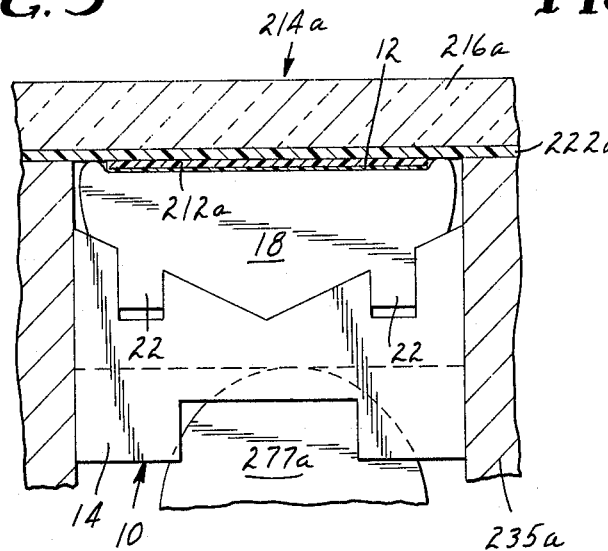

The action of the plunger assembly 10 in moving from its released position to its engaged position will now be explained with reference to FIGS. 2 through 5. In its released position (FIG. 2) the ridge 20 on the pad 18 is spaced from the strip of material 212a affording movement of the strip material 212a along the path through the device 200a. As the plunger assembly 10 starts to move toward the plate 216a (FIG. 3) the ridge 20 is the first portion of the pressure surface 12 to make contact with the strip material 212a. Subsequent movement of the plunger assembly 10 (FIG. 4) causes the material of the pad 18 to be displaced so that contact between the pressure surface 12 and the strip material 212a increases at generally an equal rate in both directions in a direction normal to the ridge 20 and transverse of the path for the strip material 212a to sweep air from between the layers of the strip material 212a. During such movement the material of the pad is displaced into the space between the pad 18 and rigid member 14, decreasing the amount of spacing therebetween until the surface of the pad 18 opposite the pressure surface 12 is entirely supported on the rigid member 14 (FIG. 5). Subsequent movement of the pad 18 causes its material to be displaced only by bulging of its end surface but produces a predetermined (e.g. generally equal at less than 150 pounds per square inch) pressure distribution across the pressure surface 12.

Return movement of the plunger assembly 10 from its engaged position (FIG. 5) to its released position (FIG. 2) allows the pressure surface 12 of the resilient pad 18 to return to its normal tented configuration, which change in shape together with the matte finish of the pressure surface 12 ensures a clean separation of the pressure surface 12 from the relatively smooth surface of the strip material 212a.

What is claimed is:

1. In a device for forming graphics along a smooth two layer strip of radiation sensitive material, said device comprising a frame, means for defining an exposure station including a plate mounted on said frame which plate is essentially transparent to radiant energy, means for defining a path for a said strip material through said exposure station adjacent one surface of said plate, a template disposed between said plate and said strip material, said template having at least one area opaque to transparent energy and at least one radiation transmissive area corresponding in shape to a graphic to be formed, a plunger assembly including a soft flexible resilient pad having a pressure surface and a rigid member supporting said resilient pad on its side opposite said pressure surface, and means for mounting said plunger assembly on said frame for movement between a released position with the pressure surface of said pad spaced from said plate to afford movement of said strip along said path and an engaged position with the pressure surface of said pad pressing said strip material against the template and plate at said exposure station, the improvement wherein:

said pad has a hardness of not greater than 35 when measured with a Shore Durometer, Type A, on said pressure surface, has a radiused ridge running centrally across said pressure surface with generally planar portions of said pressure surface on opposite sides of said ridge extending tangentially from said radiused ridge and being disposed at an included obtuse angle of no greater than about 164°, and has a matte finish on said pressure surface; and said means for mounting mounts said plunger assembly to first engage said ridge with said strip material with said ridge aligned in the direction of said path and to then displace the material of said pad with the contact between said pressure surface and said strip material increasing at a generally equal rate in both directions transverse of said path from said ridge to sweep air from between the layers of said strip material upon movement of said plunger assembly from said released position to said engaged position.

2. A device according to claim 1, wherein said pad is supported on said rigid member along support areas parallel and equally spaced from opposite sides of said ridge, and with no pressure being applied by said pressure surface said pad and said rigid member are separated between said support areas to provide a space shaped to receive a predetermined amount of said pad after contact between said ridge and said strip material during movement of said plunger assembly from said released position toward said engaged position and so that said rigid member will then support the portion of said pad between said support areas and with said support areas provide a predetermined pressure distribution between said pad and said strip material along said pressure surface upon movement of said plunger assembly to said engaged position.

3. A plunger assembly for pressing together two smooth layers of material against a firm planar supporting surface without entrapment of air between the layers, said assembly comprising:

a soft flexible resilient pad having an arched pressure surface adapted to press the layers of said material against said supporting surface, a rigid support member supporting said pad along support areas equally spaced from opposite sides of the center of the arch of said pressure surface with no pressure being applied by said pressure surface said rigid member being separated at predetermined distances from said pad between said support areas to provide a space shaped to receive a predetermined amount of said pad upon pressure being applied by said pressure surface against the layers supported on said supporting surface and so that said rigid member will then support the portion of said pad between said support areas and with said support areas provide a predetermined pressure distribution along said pressure surface upon movement of said plunger assembly to said engaged position; and means mounting said plunger assembly for movement from a released position with the pressure surface spaced from said supporting surface to afford movement of said material between said supporting surface and said pressure surface to an engaged position with the pad filling said space and the pressure surface of said pad pressing said material against said planar supporting surface so that during such movement the center of the arch of said pressure surface first engages said material and contact between the pressure surface and said material then increases at a generally equal rate in opposite directions away from the center of the arch of said pressure surface to sweep air from between the layer of said strip material.

4. A plunger assembly for pressing together two smooth layers of material against a firm planar supporting surface without entrapment of air between the layers, said assembly comprising:

a soft flexible resilient pad having a pressure surface adapted to press the layers of said material against said supporting surface, said pad having a ridge running centrally across said pressure surface with portions of said pressure surface on opposite sides of said ridge being disposed at an obtuse included angle;

a rigid support member supporting said pad along support areas parallel to and equally spaced from opposite sides of said ridge, with no pressure being applied by said pressure surface said rigid member being separated at predetermined distances from said pad between said support areas to provide a space shaped to receive a predetermined amount of said pad upon pressure being applied by said pressure surface against the layers supported on said supporting surface and so that said rigid member will then support the portion of said pad between said support areas and with said support areas provide a predetermined pressure distribution along said pressure surface upon movement of said plunger assembly to said engaged position; and means mounting said plunger assembly for movement from a released position with the pressure surface spaced from said supporting surface to afford movement of said material between said supporting surface and said pressure surface to an engaged position with the pad filling said space and the pressure surface of said pad pressing said material against said planar supporting surface so that during such movement the ridge first engages said material and contact between the pressure surface and said material then increases at a generally equal rate in both directions normal to said ridge to sweep air from between the layers of said strip material.

5. A plunger assembly according to claim 4, wherein said ridge is radiused, the pressure surface portions of opposite sides of the ridge are generally planar and extend tangentially from said radiused ridge, and said pressure surface has a matte finish.

6. A plunger assembly according to claim 5, wherein the pressure surfaces on opposite sides of the ridge are disposed at an obtuse included angle of no greater than about 164°.

* * * * *

UNITED STATES PATENT AND TRADEMARK OFFICE
CERTIFICATE OF CORRECTION

PATENT NO. : 4,087,181

DATED : May 2, 1978

INVENTOR(S) : Alexander and Pendergrass

It is certified that error appears in the above-identified patent and that said Letters Patent are hereby corrected as shown below:

In the claims:

Column 5, line 31, change "transparent to --radiant-- .

Signed and Sealed this

Twenty-fourth Day of October 1978

[SEAL]

Attest:

RUTH C. MASON
*Attesting Officer*

DONALD W. BANNER
*Commissioner of Patents and Trademarks*